United States Patent [19]

von der Decken et al.

[11] 4,270,712
[45] Jun. 2, 1981

[54] METHOD AND APPARATUS FOR ROLLING CONTROL OF AIRPLANES BY MEANS OF SPOILERS

[75] Inventors: Jan von der Decken; Heinz Max, both of Friedrichshafen, Fed. Rep. of Germany

[73] Assignee: Dornier GmbH, Fed. Rep. of Germany

[21] Appl. No.: 57,447

[22] Filed: Jul. 13, 1979

[30] Foreign Application Priority Data

Mar. 9, 1979 [DE] Fed. Rep. of Germany ....... 2909244

[51] Int. Cl.³ .......................... B64C 9/32; B64C 13/32
[52] U.S. Cl. .................................... 244/90 A; 244/213
[58] Field of Search .................... 244/213, 90 R, 90 A

[56] References Cited

U.S. PATENT DOCUMENTS

| 2,070,006 | 2/1937 | Eaton et al. | 244/90 A |
| 2,635,837 | 4/1953 | Grant | 244/90 A |
| 2,925,232 | 2/1960 | Murray et al. | 244/213 |
| 3,628,756 | 12/1971 | Johnson | 244/213 |

FOREIGN PATENT DOCUMENTS 439592 12/1935 United Kingdom .................... 244/213

Primary Examiner—Galen L. Barefoot
Attorney, Agent, or Firm—James E. Bryan

[57] ABSTRACT

This invention relates to a method for rolling control of an airplane by means of spoilers mounted at lift surfaces, which comprises subdividing the entire control range into a plurality of firmly graduated and successively adjustable control steps, and adjusting the individual control steps by means of a series of different partial spoiler surfaces actuatable in dependence upon each other either individually or in combination. The invention also relates to an apparatus for performing the method.

4 Claims, 5 Drawing Figures

METHOD AND APPARATUS FOR ROLLING CONTROL OF AIRPLANES BY MEANS OF SPOILERS

The present invention relates to a method for the rolling control of airplanes by means of spoilers mounted at lifting surfaces and to an apparatus for carrying out the inventive method.

For the purpose of improving the cruising flight performance of an airplane, as high as possible a wing loading is sought. Good short take-off and landing performances, on the other hand, require a low wing loading and high lift coefficients. The latter are obtained by means of high-lift systems, such as, for example, leading edge and trailing edge flaps. A considerable part of the wing span is, however, already taken up by the ailerons serving for rolling control, and hence is no longer usable for high-lift producing trailing edge flaps. As an alternative, one works therefore partly with an aileron presetting which, however, can replace only a part of the high-lift production of a landing flap, and additionally leads either to a reduction of the aileron efficacy, or to very complicated aileron-actuating kinematics.

It is also generally known in the art to have the rolling control function of the ailerons executed by a spoiler system. While it is true that in this case the landing flaps for the high-lift production can extend over the entire wing span, the spoilers have the disadvantage of non-linearity in the effectiveness thereof, and even the disadvantage of effectiveness reversal with small spoiler deflections and retracted landing flaps.

Based on this state of the art, it is the object of the present invention to improve rolling control by means of spoilers in such a manner that the effectiveness thereof has a constant course and is practically linear with respect to the control stick deflection.

This object is obtained, in accordance with the present invention, by virtue of the fact that the entire control range is subdivided into a plurality of firmly graduated and successively adjustable control steps, and in that the individual control steps are adjustable by means of a series of different partial spoiler surfaces actuatable in dependence upon each other either individually or in combination. For producing a rolling moment, the partial spoiler surfaces are extended respectively into a defined effective position, i.e. the partial spoiler surfaces are either retracted or totally extended (for example 60°), or extended suddenly into a specific position to such an extent (for example 30°) that a defined lift-reducing effect is attained. Continuous intermediate positions with the aforementioned possibility for the effectiveness reversal will no longer arise.

Due to this "yes-no" or stepwise control of the individual partial spoiler surfaces, a digitalization of the rolling control is effected. Depending upon the size, combination, and deflection of the individual partial spoiler surfaces, one obtains therewith a quasi-continuous course of the rolling moment by way of the control stick deflection (step curve). Because in the rolling axis a constant control surface deflection—i.e. a constant rolling moment—is proportional to a stationary rolling speed about this axis, any desired rolling control maneuver may be flown from the combination of partial spoiler deflections and the deflection time.

It is assumed that in the outer third of a wing span the lift variation due to spoiler impact with the lever arm to the rolling axis furnishes for each profile section an equally large rolling moment, a first preliminary conception may be developed by way of a usable spoiler graduation. With this premise, for example an approximately linear course (a uniform step curve) of the rolling moment above the control stick deflection is attainable for seven control steps with three spoiler surfaces. Achievable with four partial spoiler surfaces are already ten or even fifteen control steps. With only one further above-mentioned intermediate position (for example 30° and 60°), the number of the control steps is respectively doubled. Seven to ten control steps for the entire control range will, however, already suffice to transmit to the pilot the feeling of a "smooth" control behavior of the airplane. As compared to the normal ailerons with their normally opposite effectiveness, the digital control described herein will also result in the additional advantage of a yawing moment acting in the sense of a curve, which additionally facilitates navigation of the aircraft.

One embodiment of the present invention will now be further described hereinafter with reference to the accompanying drawings, wherein FIG. 1 illustrates a schematic spoiler graduation for seven control steps;

Figure 1:
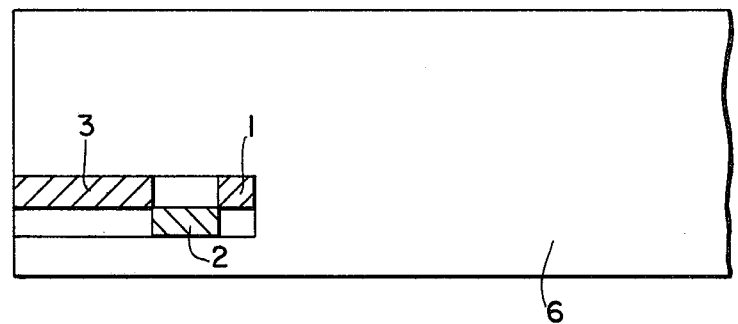

A wing 6 is schematically illustrated in FIG. 1 departing from the longitudinal central axis of an airplane, shown in dash-dotted lines. The other wing, positioned symmetrically with respect thereto, has been omitted for the sake of simplification. Shown approximately in the outer third of the wing 6 are three partial spoiler surfaces 1, 2, and 3. The shading is meant to indicate that these partial spoiler surfaces are actuatable separately from each other in the manner of a "yes-no" control. The graduation of the spoiler surfaces has been so chosen that the partial spoiler surface 1 produces approximately 14.3%, the partial spoiler surface 2 approximately 28.6%, and the partial spoiler surface 3 approximately 57.1% of the effective rolling moment variation. As is apparent from Table 1 below, there will result from the aforementioned three partial spoiler surfaces, when they are extended either individually or in combination, in the manner of a step curve seven uniform control steps for the rolling moment change or variation. When it is now assumed that the partial spoiler surfaces 1 and 3 shown at the top of FIG. 1 with left shading are extended, it is clear from Table 1 that this combination corresponds to the control step 5 with a rolling moment change of 71.4%.

TABLE 1

| Control Step | partial spoiler surface | rolling moment change in % |
|---|---|---|
| 1 | 3 | 14.3 |
| 2 | 1 + 3 | 28.6 |
| 3 | 2 + 3 | 42.9 |
| 4 | 1 + 2 + 3 | 57.1 |
| 5 | 1 + 4 | 71.4 |
| 6 | 2 + 4 | 85.7 |
| 7 | 1 + 2 + 4 | 100.0 |

The spoiler graduation is so chosen that the rolling moment changes or variations produced by the individual partial spoiler surfaces amount respectively to a whole number multiple of the rolling moment caused by the smallest partial spoiler surface. In the present example, the spoiler division or graduation has a stage progression according to two exponents (1-2-4).

When the arrangement is so made that the partial spoiler surfaces may be adjusted respectively to three defined positions, for example "retracted"—"30°"–"60°", there will result, instead of the aforementioned outer seven control steps, already fourteen control steps with respectively about 7.1% rolling moment change or variation. Because, however, the partial spoiler surfaces assume at all times a precisely defined position and small spoiler deflections are avoided, there is no way for the aforementioned disadvantage of the effectiveness reversal to actually arise.

Figure 2:
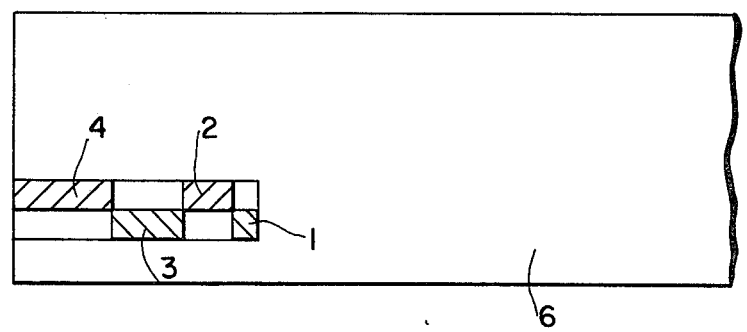
FIG. 2 illustrates a schematic spoiler graduation for ten control steps.

FIG. 2 is analogous to FIG. 1. The sole difference resides in that provided herein are four partial spoiler surfaces 1 to 4 approximately in the outer third of the wing 6. The graduation of the spoiler surfaces has been so chosen herein that ten uniform control steps may be achieved. Apparent from Table 2 below are the ten control steps and the coordinated spoiler combinations as well as the rolling moment change or variation. When it is now assumed that the partial spoiler surfaces 2 and 4 indicated in FIG. 2 at the top thereof with left shading are extended, it will be obvious from Table 2 that this combination corresponds to the control step 6 with a 60% rolling moment change or variation. Here again it is possible to refine, for example double, the control steps because of the aforementioned possibility of the stepwise setting or adjustment of the partial spoiler surfaces into defined intermediate positions.

TABLE 2

| Control step | partial spoiler surface | rolling moment change in % |
|---|---|---|
| 1 | 1 | 10 |
| 2 | 2 | 20 |
| 3 | 3 or 1 + 2 | 30 |
| 4 | 4 or 1 + 3 | 40 |
| 5 | 1 + 4 or 2 + 3 | 50 |
| 6 | 1 + 2 + 3 or 2 + 4 | 60 |
| 7 | 1 + 2 + 4 or 3 + 4 | 70 |
| 8 | 1 + 3 + 4 | 80 |
| 9 | 2 + 3 + 4 | 90 |
| 10 | 1 + 2 + 3 + 4 | 100 |

With a different graduation of the four partial spoiler surfaces, for example into stages of 6.66%, 13.33%, 26.66%, and 53.33%, there will result even fifteen uniform control steps of a step curve, whereby each step curve corresponds to 6.66% of rolling moment change or variation. Even though—when taking into consideration the real lifting variation or change by spoiler deflection and the sought-after rolling moment course over the control stick deflection—the respective partial spoiler surfaces vary in their size from wing to wing, the aforementioned tables and embodiments show that, for realizing a seven-step control or a ten-step control, only three or four "yes-no" steered partial spoiler surfaces are required. A simple control kinematic system is therefore to be anticipated in each case.

Figure 3:
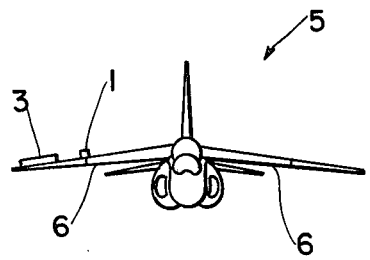
FIG. 3 is a top plan view of the spoiler arrangement on an airplane.
Figure 4:
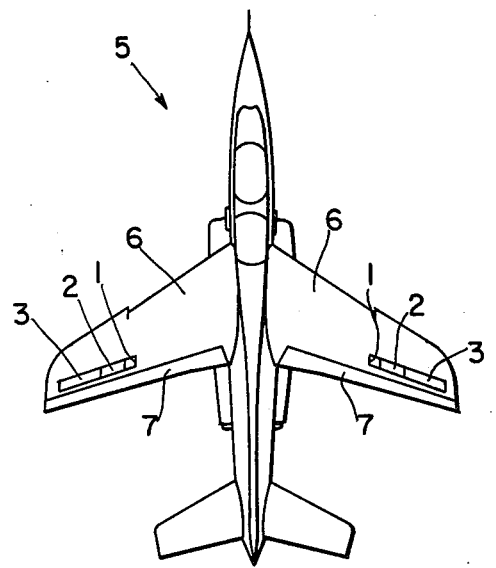
FIG. 4 is a front view of the spoiler arrangement on an airplane.

FIG. 3 shows an airplane 5 in a top plan view thereof, and FIG. 4 illustrates the airplane in a front view thereof. Here again, reference numeral 6 indicates the wings. Mounted at the upper side of each wing are the partial spoiler surfaces, 1, 2, and 3. As is apparent from FIG. 4, the partial spoiler surfaces 1 and 3 on one wing are extended in a manner analogous to FIG. 1. This combination corresponds again to control step 5 of Table 1 with a 71.4% effectiveness of the rolling moment change or variation and 71.4% control stick deflection.

Figure 5:
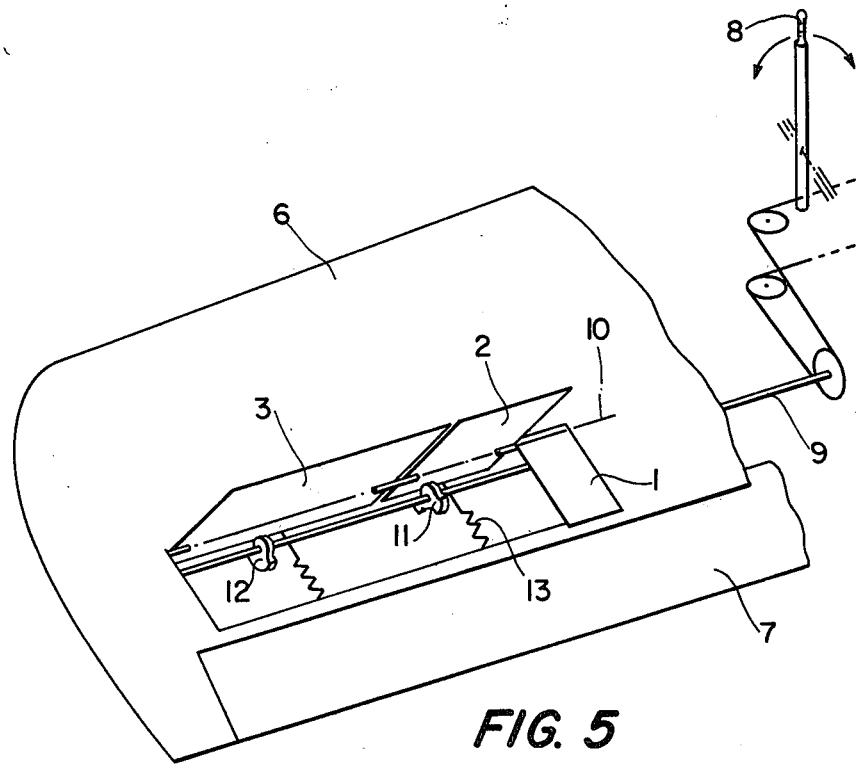
FIG. 5 shows a structural embodiment for the spoiler actuation.

FIG. 5 illustrates on the basis of a simple embodiment how the spoiler control may be effected mechanically. The device shown has been illustrated only schematically and may be varied in any desired manner known to one skilled in the art. The wing 6 contains in the outer third again the partial spoiler surfaces 1, 2, and 3. These partial spoiler surfaces are pivotal about a joint axis 10. As shown in FIG. 5, the partial spoiler surfaces 2 and 3 are herein fully extended. The actuation of the partial spoiler surfaces is effected from the control stick 8 by way of known gear means and therefore have not been further described herein, and acts upon a rotary shaft 9. Mounted on this rotary shaft 9 is one cam plate each for each partial spoiler surface. Visible in this figure are the two cam plates 11 and 12 for the partial spoiler surfaces 2 and 3. The angular position of the cam plates 11 and 12 in conjunction with the springs 13 determines the position "retracted" or "extended" of the partial spoiler surfaces. The indicated position of the partial spoiler surfaces 2 and 3 corresponds to control step 6 of Table 1 with 85.7% rolling moment change or variation.

The displacement of the individual partial spoiler surfaces does not involve more expenditures, or is even simpler than in ailerons because of the comparatively small deflecting forces (spoiler hinge moments). In addition to the above-described mechanical spoiler control by way of a rotary shaft provided with cam plates, a hydraulic or an electrohydraulic control is, of course, also possible. Here again, joint rotary shafts may be provided for and a plurality of individual cylinders are to be provided corresponding to the number of the partial spoiler surfaces by way of which these partial spoiler surfaces are actuated. In place of the above-mentioned gearing means between the control stick and the partial spoiler surfaces, any other desired transmission means may, of course, be employed. The type of the displacement structure depends accordingly only upon the respectively existing aircraft and its subsystems and is not limited to a specific use thereof.

It will be obvious to those skilled in the art that many modifications may be made within the scope of the present invention without departing from the spirit thereof, and the invention includes all such modifications.

What is claimed is:

1. An apparatus for rolling control of an airplane by means of spoilers mounted at lift surfaces, comprising spoiler means subdivided into at least three separate individual partial spoiler surfaces in succession in a span direction, and means for suddenly adjusting said partial spoiler surfaces independently of each other from a zero position to a defined operative position, whereby a plurality of fixed, ladder-like control steps are effected.

2. An apparatus according to claim 1 in which said partial spoiler surfaces have different dimensions, whereby rolling moments produced thereby respectively amount to a multiple of the smallest rolling moment producible by an individual partial spoiler surface.

3. A method for rolling control of an airplane by means of spoilers mounted at lift surfaces, which comprises subdividing the entire control range into a plurality of fixed, ladder-like control steps, and adjusting the individual control steps by suddenly adjusting a series of different partial spoiler surfaces, actuatable in dependence upon each other either individually or in combination, into at least two defined effective positions for the purpose of producing a rolling moment.

4. A method according to claim 3 in which the producible rolling moments of the individual partial spoiler surfaces are graduated into uniform steps.

* * * * *

UNITED STATES PATENT AND TRADEMARK OFFICE
CERTIFICATE OF CORRECTION

PATENT NO. : 4,270,712
DATED : June 2, 1981
INVENTOR(S) : Jan von der Decken; Heinz Max It is certified that error appears in the above—identified patent and that said Letters Patent is hereby corrected as shown below:

Column 1, line 66, "It is" should read - - - If it is - - -.

Column 2, Table 1, all of the numbers under the heading entitled "partial spoiler surface" are incorrect and should read as follows:

- - -    1
         2
         1 + 2
         3
         1 + 3
         2 + 3
         1 + 2 + 3     - - -.

Signed and Sealed this

Twenty-fifth Day of August 1981

[SEAL]

Attest:

Attesting Officer

GERALD J. MOSSINGHOFF

Commissioner of Patents and Trademarks